United States Patent
Yoo et al.

(10) Patent No.: US 11,332,375 B2
(45) Date of Patent: May 17, 2022

(54) PEELING DEVICE OF SHEET MATERIAL INCLUDING OPTIMIZED OUTLET

(71) Applicant: LG Chem, Ltd., Seoul (KR)

(72) Inventors: Kwang Hyun Yoo, Daejeon (KR); Eun Jeong Kim, Daejeon (KR); In Young Kim, Daejeon (KR); Pum Suk Park, Daejeon (KR); Ye Hoon Im, Daejeon (KR); Won Jong Kwon, Daejeon (KR)

(73) Assignee: LG Chem, Ltd.

( * ) Notice: Subject to any disclaimer, the term of this patent is extended or adjusted under 35 U.S.C. 154(b) by 652 days.

(21) Appl. No.: 15/747,342

(22) PCT Filed: Sep. 23, 2016

(86) PCT No.: PCT/KR2016/010694
§ 371 (c)(1),
(2) Date: Jan. 24, 2018

(87) PCT Pub. No.: WO2017/052290
PCT Pub. Date: Mar. 30, 2017

(65) Prior Publication Data
US 2018/0215622 A1  Aug. 2, 2018

(30) Foreign Application Priority Data
Sep. 25, 2015  (KR) .................. 10-2015-0137055

(51) Int. Cl.
*B32B 43/00* (2006.01)
*C01B 32/19* (2017.01)
(Continued)

(52) U.S. Cl.
CPC ............ *C01B 32/19* (2017.08); *C01B 32/194* (2017.08); *C01B 32/21* (2017.08); *B32B 38/10* (2013.01);
(Continued)

(58) Field of Classification Search
CPC ....... B32B 38/10; B32B 43/006; C01B 32/19; C01B 32/194; C01B 32/21
See application file for complete search history.

(56) References Cited

U.S. PATENT DOCUMENTS

| 2010/0147188 A1 | 6/2010 | Mamak et al. |
| 2012/0263013 A1 | 10/2012 | Xiong et al. |

(Continued)

FOREIGN PATENT DOCUMENTS

| CN | 102602925 A | 7/2012 |
| DE | 102007011205 A1 | 9/2008 |

(Continued)

OTHER PUBLICATIONS

Search report from International Application No. PCT/KR2016/010694, dated Jan. 2, 2017.

(Continued)

*Primary Examiner* — Philip C Tucker
*Assistant Examiner* — Nickolas R Harm
(74) *Attorney, Agent, or Firm* — Lerner, David, Littenberg, Krumholz & Mentlik, LLP

(57) ABSTRACT

The present invention relates to a peeling device of sheet material for peeling off graphite, and the peeling device of sheet material according to the present invention is characterized in that a specific microchannel is used to apply a shear force required to peel off graphite, and simultaneously, graphene itself is not ground and the discharge flow rate of the graphene dispersion increases to increase graphene preparation efficiency.

4 Claims, 2 Drawing Sheets

(51) Int. Cl.
*C01B 32/194* (2017.01)
*C01B 32/21* (2017.01)
*B32B 38/10* (2006.01)

(52) U.S. Cl.
CPC ........ *B32B 43/006* (2013.01); *Y10T 156/1111* (2015.01)

(56) References Cited

U.S. PATENT DOCUMENTS

| | | |
|---|---|---|
| 2012/0270108 A1 | 10/2012 | Shin et al. |
| 2015/0158729 A1 | 6/2015 | Wu et al. |
| 2017/0166449 A1 | 6/2017 | Yoo et al. |

FOREIGN PATENT DOCUMENTS

| | | |
|---|---|---|
| EP | 2495216 A2 | 9/2012 |
| EP | 3056469 A1 | 8/2016 |
| JP | 2003290646 A | 10/2003 |
| JP | 2006117871 A | 5/2006 |
| JP | 2006347515 A | 12/2006 |
| JP | 2009090230 A | 4/2009 |
| JP | 2012227147 A | 11/2012 |
| JP | 5415725 B2 | 2/2014 |
| JP | 2014118315 A | 6/2014 |
| JP | 5649979 B2 | 1/2015 |
| KR | 20070081004 A | 8/2007 |
| KR | 101043895 B1 | 6/2011 |
| KR | 20130027768 A | 3/2013 |
| KR | 101264316 B1 | 5/2013 |
| KR | 101455040 B1 | 10/2014 |
| KR | 101499530 B1 | 3/2015 |
| KR | 20150076093 A | 7/2015 |
| KR | 20150076105 A | 7/2015 |
| WO | 2014097234 A2 | 6/2014 |
| WO | 2015099457 A1 | 7/2015 |
| WO | 2015184302 A1 | 12/2015 |

OTHER PUBLICATIONS

Nacken, T.J., et al., "Delamination of Graphite in A High Pressure Homogenizer." RSC Advances, 2015, vol. 5, No. 71, pp. 57328-57338, Accepted Jun. 23, 2015.

Tolle, Folke Johannes, et al., "Emulsifier-free Graphene Dispersions with High Graphene Content for Printed Electronics and Freestanding Graphene Films." Advanced Functional Materials, vol. 22, No. 6, pp. 1136-1144. Published online Jan. 27, 2012.

Extended European Search Report for Application No. EP16849015.9 dated Mar. 28, 2018.

Microfluidics: "M-110EH-30 Microfluidizer (TM)", Jan. 1, 2012, XP55459998, Retreived from the Internet: URL: https://www.microfluidicscorp/com/sites/default/files/Microfluidics%20110EH-30%20REVISED%20December%202017.pdf [retreived on Mar. 15, 2018].

Panagiotou et al., "Deagglomeration and dispersion of carbon nanotubes using Microfluidizer<(R)> high shear fluid processors", Nanotechnology 2008: Materials, Fabrication, Particles, and Characterization. Technical Proceedings of the 2008 NSTI Nanotechnology conference and trade show Nano Science and Technology Institute Cambridge, MA, USA, vol. 1, pp. 39-42, ISBN 978-1-4200-8503-7.

Yurdakul et al., "Nanoscopic characterization of two-dimensional (2D) boron nitride nanosheets (BNNSs) produced by microfluidization", Ceramics International, Apr. 1, 2012, vol. 38, No. 3, pp. 2187-2193, XP055459295.

Yi et al., "A fluid dynamics route for producing graphene and its analogues", Chin. Sci. Bull., Published online Apr. 4, 2014, vol. 59, No. 16, pp. 1794-1799.

[FIG. 1]
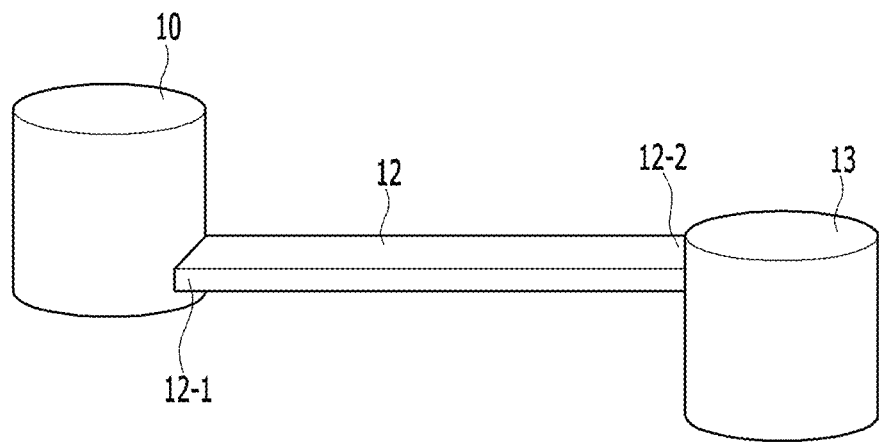
[FIG. 2]
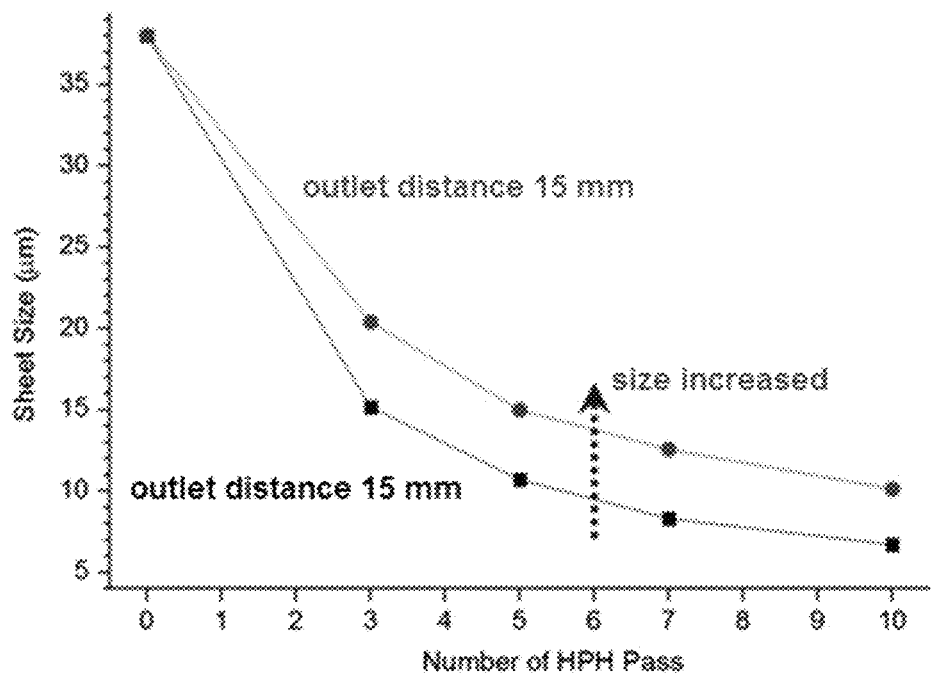

[FIG. 3]
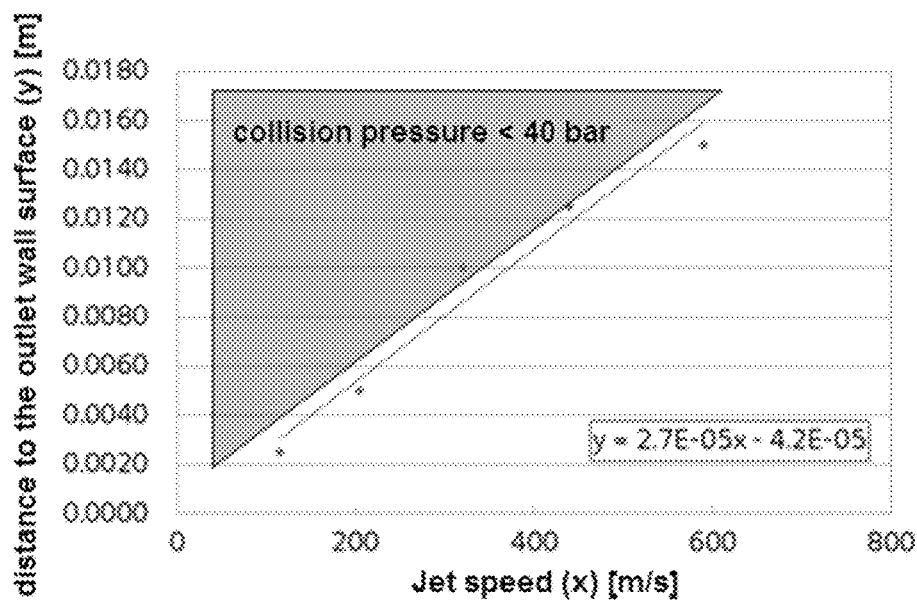

PEELING DEVICE OF SHEET MATERIAL INCLUDING OPTIMIZED OUTLET

CROSS-REFERENCE TO RELATED APPLICATION(S)

The present application is a national phase entry under 35 U.S.C. § 371 of International Application No. PCT/KR2016/010694 filed on Sep. 23, 2016, which claims priority from Korean Patent Application No. 10-2015-0137055 filed on Sep. 25, 2015 with the Korean Intellectual Property Office, the disclosures of which are herein incorporated by reference in their entirety.

TECHNICAL FIELD

The present invention relates to a peeling device of sheet material that is effective for peeling off graphite and can prepare large area graphene, and a method for preparing graphene using the device.

BACKGROUND ART

Graphene is a half-metallic material forming an arrangement wherein carbon atoms are connected in a two-dimensional hexagonal shape by sp2 bonds, and having a thickness corresponding to the carbon atom layer. Recently, it has been reported that as the result of assessing the properties of a graphene sheet having one layer of carbon atoms, electron mobility is about 50,000 $cm^2/Vs$ or more, thus exhibiting very excellent electric conductivity.

Further, graphene has characteristics of structural and chemical stability and excellent thermal conductivity. In addition, since it consists only of carbon, relatively light atom, it is easy to process one dimensional or two dimensional nanopattern. Due to such electrical, structural, chemical and economical properties, graphene is predicted to replace silicon-based semiconductor technology and transparent electrodes from now on, and particularly, it is expected to be applied in the field of flexible electronic devices due to the excellent mechanical properties.

Due to such many advantages and excellent properties of graphene, various methods capable of more effectively mass-producing graphene from carbonaceous material have been suggested or studied. Particularly, studies on the methods capable of easily preparing graphene sheets or flakes having thinner thickness and large area have been variously progressed, so that the excellent properties of graphene may be manifested more dramatically.

As the existing method of preparing graphene, methods of obtaining graphene or oxides thereof by peeling off by physical methods such as using tape, or chemical methods such as oxidation of graphite, or peeling off an intercalation compound in which acid, base, metal, etc. are inserted between the carbon layers of graphite, are known. Recently, a method of preparing graphene by peeling off carbon layers included in graphite by milling with a ball mill or ultrasonic irradiation, while dispersing graphite in a liquid phase, is being commonly used. However, these methods have disadvantages in that graphene defects are generated, processes are complicated, and graphene yield is low.

Meanwhile, a peeling device of sheet material is a device of applying a high pressure to a microchannel having a micrometer scale diameter, thus applying a strong shear force to the material passing it through, and if graphite is peeled off using the sheet peeling device, graphene yield can be increased.

However, since a peeling device of sheet material is commonly designed and prepared with the purpose of crushing and dispersing of particles, a fluid passing through a microchannel strongly collides the wall surface of an outlet. Thus, in case peeled-off graphene collides the wall surface of an outlet, graphene itself may be ground and the particle size of graphene may decrease.

Accordingly, as the result of studies on sheet peeling devices that are effective for peeling off graphite and can prepare large area graphene, the present inventors confirmed that if an outlet of a specific shape as described below is used, the above problems can be solved, and completed the present invention.

DISCLOSURE

Technical Problem

It is an object of the present invention to provide a peeling device of sheet material that is effective for peeling off graphite and can prepare large area graphene.

It is another object of the present invention to provide a method for preparing graphene using the above peeling device of sheet material.

Technical Solution

In order to solve the objects, the present invention provides a peeling device of sheet material comprising:

an inlet into which sheet material is supplied;

a high pressure pump that is positioned at the front end of the inlet, and generates a pressure for pressurizing the sheet material;

a microchannel positioned at the back end of the inlet, through which the sheet material passes by the pressure generated by the high pressure pump, whereby the sheet material is homogenized; and an outlet positioned at the back end of the microchannel, wherein the minimum distance (y, unit m) between the back end of the microchannel and the outlet wall surface where the sheet material discharged from the back end of the microchannel collides, and the speed (x, unit m/s) of the sheet material at the back end of the microchannel satisfy the following Equation 1:

$$y \geq (2.7 \times 10^{-5})x - (4.2 \times 10^{-5}) \quad \text{[Equation 1]}$$

Further, the present invention provides a method for preparing graphene using the above peeling device of sheet material, said method comprising the steps of: 1) supplying a solution comprising graphite to the inlet; 2) putting pressure on the inlet with a high pressure pump to pass the solution comprising graphite through the microchannel; and 3) recovering a graphene dispersion from the outlet.

Advantageous Effects

The peeling device of sheet material according to the present invention is characterized in that graphene preparation efficiency may be increased without grinding graphene itself, by using a specific outlet.

BRIEF DESCRIPTION OF THE DRAWINGS

FIG. 1 is a schematic diagram of the peeling device of sheet material according to the present invention.

FIG. 2 shows the size of graphene prepared using the peeling device of sheet material according to the present invention, according to microchannel pass number.

FIG. 3 shows the relationship between the minimum distance between the back end of a microchannel and the outlet wall surface where the sheet material discharged from the back end of the microchannel collides, and the speed of the sheet material at the back end of the microchannel, using the peeling device of sheet material according to the present invention.

DETAILED DESCRIPTION OF THE EMBODIMENTS

Hereinafter, the present invention will be explained in detail.

A peeling device of sheet material means a device that applies high pressure to a microchannel having a micrometer scale diameter, so as to apply a strong shear force to the material passing it through. By the shear force, the material passing through the microchannel is ground and dispersed, and thus, it is being used for preparing highly dispersed material. Thus, the peeling device of sheet material is being used for the preparation of products requiring high dispersion, for example, in various fields such as electrical/electronic material, bioengineering, pharmaceutical, food, fiber, painting, cosmetic industries, etc.

Meanwhile, since the peeling device of sheet material is designed and prepared for crushing and grinding of material through a strong shear force, in general, a fluid passing through a microchannel strongly collides the wall surface of an outlet. However, the collision with the wall surface of the outlet may become a disadvantage according to the purpose of use the sheet peeling device.

Particularly, the present invention is aimed at the preparation of graphene by peeling off graphite with a peeling device of sheet material, but in case a fluid passing through the microchannel strongly collides the wall surface of the outlet, peeled-off graphene itself may be ground. Thus, the size of graphene becomes small, thus lowering the preparation yield of large area graphene.

Thus, the present invention provides a peeling device of sheet material that can increase preparation efficiency of large area graphene without grinding of graphene itself, within a range where a shear force required for peeling off graphite is applied.

First, FIG. 1 is a schematic diagram of the peeling device of sheet material according to the present invention. The peeling device of sheet material (1) according to the present invention comprises an inlet (10) into which sheet material is supplied; a high pressure pump (11) that is positioned at the front end of the inlet (10), and generates a pressure for pressurizing the sheet material; a microchannel (12) positioned at the back end of the inlet (10), through which the sheet material passes by the pressure generated by the high pressure pump, whereby the sheet material is homogenized; and an outlet (13) positioned at the back end of the microchannel (12).

Thus, pressure is applied to the inlet (10) by the high pressure pump (11), and sheet material supplied in the inlet (10) passes through the microchannel (12). Since the cross sectional area of the microchannel (12) is small, if a pressure higher than the pressure applied to the inlet (10) is applied to the microchannel (12), and the sheet material receives a strong shear force and homogenized. The sheet material passing through the microchannel (12) is discharged to the outlet (13).

Particularly, in the present invention, the sheet material may be graphite, and peeling may occur by the strong shear force in the microchannel (12) to prepare graphene. Here, there is a need to control the minimum distance between the back end (12-1) of the microchannel and the outlet (13) wall surface where the sheet material discharged from the back end (12-1) of the microchannel collides, so that the energy of collision of a fluid passing through the microchannel (12) with the wall surface of the outlet (13) may be reduced and graphene itself may not be ground, The minimum distance between the back end (12-1) of the microchannel and the outlet (13) wall surface where the sheet material discharged from the back end (12-1) of the microchannel collides means a distance from the back end of the microchannel to the outlet wall surface in a direction where a fluid passing through the microchannel (12) progresses. More specifically, it means a distance from the back end (12-1) of the microchannel (12) to the point where the extended line of the length direction of the microchannel (12) and the outlet (13) wall surface meet. For example, the outlet (13) may be cylindrical, and in this case, the back end (12-1) of the microchannel (12) is connected to the lateral face of the cylindrical outlet, and thus, the minimum distance from the back end (12-1) of the microchannel to the outlet (13) wall surface where sheet material discharged from the back end (12-1) of the microchannel collides means the diameter of the cylinder.

Meanwhile, in commonly used sheet peeling devices, due to the limitation in the mechanical strength of the material used in a microchannel, the operating pressure in the microchannel is about 100 bar to about 3000 bar. Further, for homogenization in the microchannel, the cross sectional area of the microchannel is controlled within a range of about $1.00 \times 10^2$ um$^2$ to $1.44 \times 10^8$ um$^2$, and according to the operating pressure and the cross sectional area, the speed of the sheet material at the back end of the microchannel, i.e., discharge speed is determined.

Thus, as the discharge speed is higher, the minimum distance between the back end of the microchannel and the outlet wall surface where sheet material discharged from the back end of the microchannel collides should be long. Meanwhile, in case a collision pressure at the time of collision of graphene with the outlet wall surface is 40 bar or less, grinding of graphene does not occur, and thus, the discharge speed and the minimum distance between the back end of the microchannel and the outlet wall surface where sheet material discharged from the back end of the microchannel collides should be controlled so that a collision pressure may become 40 bar or less.

In the present invention, while the minimum distance between the back end of the microchannel and the outlet wall surface where sheet material discharged from the back end of the microchannel collides is designated as a variable y (unit m), and the speed of the sheet material at the back end of the microchannel is designated as a variable x (unit m/s), a collision pressure according to the control of each variable was measured, and the results are shown in FIG. 3.

As shown in FIG. 3, a graph of the case wherein a collision pressure is 40 bar could be obtained, and thus, if the Equation 1 is fulfilled, grinding of graphene did not occur. Meanwhile, the x and y values in the Equation 1 mean numerical values except each unit.

Preferably, the minimum distance(y) is 0.001 m to 0.050 m. More preferably, the minimum distance(y) is 0.005 m or more, 0.006 m or more, 0.007 m or more, 0.008 m or more, 0.009 m or more, 0.010 m or more, 0.011 m or more, 0.012 m or more, 0.013 m or more, 0.014 m or more, or 0.015 m or more.

Preferably, the speed (x) of the sheet material at the back end of the microchannel is 10 m/s to 600 m/s. As explained above, the speed of the sheet material at the back end of the microchannel may be controlled by the operating pressure in the microchannel and the cross sectional area of the microchannel.

Further, the peeling device of sheet material according to the present invention may be equipped with a supply line for supplying sheet material to the inlet (10). Through the supply line, the input of sheet material, etc. can be controlled.

Further, the present invention also provides a method for preparing graphene using the above sheet peeling device, said method comprising the steps of:

1) supplying a solution comprising graphite to the inlet (10);
2) putting pressure on the inlet (10) with a high pressure pump (11) to pass the solution comprising graphite through the microchannel (12); and
3) recovering a graphene dispersion from the outlet (13).

As explained above, the method for preparing graphene is conducted so as to fulfill the requirement of the above Equation 1, thereby preventing graphene from colliding the wall surface of the outlet and being ground.

The pressure of the step 2 is preferably 100 to 3000 bar. Further, after recovering a graphene dispersion from the outlet (13), it may be reintroduced into the inlet (10). The reintroduction process may be conducted 2 to 30 times repeatedly. The reintroduction process may be conducted using the sheet peeling device used, or using plural sheet peeling devices. Further, the reintroduction process may be conducted dividedly according to the process, or may be continuously conducted.

Meanwhile, the method for preparing graphene may further comprise the steps of recovering graphene from the recovered graphene dispersion and drying it. The recovery step may be progressed by centrifugation, vacuum filtration or pressure filtration. Further, the drying step may be conducted by vacuum drying or general drying at a temperature of about 30 to 200° C.

Further, the size of graphene prepared according to the present invention is large and uniform, and thus, favorable for the realization of the unique properties of graphene. The prepared graphene may be redispersed in various solvents and utilized as various uses such as a conductive paste composition, a conductive ink composition, a composition for forming a heat radiating substrate, an electroconductive complex, a thermally conductive complex, a complex for shielding EMI, or conductor or slurry for batteries, etc.

Hereinafter, preferable examples are presented for better understanding of the present invention. However, these examples are presented only as the illustrations of the present invention, and the present invention is not limited thereby.

Example 1

1) A Peeling Device of Sheet Material

A microchannel as shown in FIG. 1 was used. A device comprising an inlet (10), a microchannel (12) and an outlet (13) as shown in FIG. 1 was used. An inlet (10) and an outlet (13) with cylindrical shapes (diameter 1.5 mm and height 2.5 mm) were used, and a microchannel (12) with a width 320 μm, height 100 μm and length 2400 μm, having a rectangular cross section (12-1 and 12-2) was used.

2) Peeling of Graphite 2.5 g of graphite (BNB90) and 1 g of PVP58k (polyvinylpyrrolidone, weight average molecular weight: 58 k) as a dispersant were mixed with 500 g of distilled water to prepare a feed solution. The feed solution was supplied while applying a high pressure of 730 bar through the inlet (10), and the feed solution was recovered from the outlet (13).

Example 2

Graphene was prepared using the same device as Example 1, except that an outlet (13) with an increased diameter of 15 mm was used.

Experimental Example 1

The size of graphene in the sample obtained in each Example was measured. Specifically, the lateral size distribution of dispersed graphene was measured with LA-960 Laser Particle Size Analyzer, and the results are shown in FIG. 3. As shown in FIG. 2, it was confirmed that as the result of increasing the outlet distance by 10 times, the size of sheet peeled off 10 times was improved about 2 times, and improved about 4 times based on the area.

Experimental Example 2

The peeling device of sheet material used in Example 1 was used, except that a device capable of measuring a collision pressure that can control the distance from the back end of the microchannel was used instead of the outlet. The speed of the sheet material discharged from the back end of the microchannel was controlled to specific values, and the distances from the back end of the microchannel where a collision pressure at each discharge rate became 40 bar were measured, and the results are shown in FIG. 3.

In FIG. 3, collision pressures became 40 bar or less in the region indicated by blue, and it was confirmed that the grinding of graphene did not occur in the above range.

EXPLANATION OF SIGN

1: peeling device of sheet material
10: inlet
11: high pressure pump
12: microchannel
12-1: back end of microchannel
13: outlet

The invention claimed is:

1. A method for preparing graphene using a peeling device of sheet material, comprising:
supplying a solution comprising graphite to an inlet of the peeling device into which sheet material is supplied;
applying pressure on the inlet, for pressurizing the sheet material, using a high pressure pump positioned at a front end of the inlet;
passing the solution at a speed through a microchannel positioned at a back end of the inlet, to homogenize the sheet material; and
recovering the graphene from an outlet positioned at a back end of the microchannel,
wherein a distance (y) between the back end of the microchannel and an outlet wall surface where the sheet material discharged from the back end of the microchannel collides, and the speed (x) of the sheet material at the back end of the microchannel satisfy the following Equation 1:

$$y = \geq m*x - b, \quad \text{[Equation 1]}$$

wherein $m = 2.7 \times 10^{-5}$ s,
wherein the speed (x) of the sheet material at the back end of the microchannel is 10 m/s to 600 m/s, and
wherein $b = 4.2 \times 10^{-5}$ m.

2. The method according to claim 1, wherein the outlet is cylindrical, and the back end of the microchannel is positioned at a lateral face of the cylindrical outlet.

3. The method according to claim 1, wherein a supply line for supplying the sheet material to the inlet is equipped.

4. The method for preparing graphene according to claim 1, wherein the step of applying pressure comprises applying a pressure between about 100 and about 3000 bar.

\* \* \* \* \*